(12) United States Patent
Teraoka et al.

(10) Patent No.: US 9,169,891 B2
(45) Date of Patent: Oct. 27, 2015

(54) SHOCK ABSORBING DEVICE

(75) Inventors: Takashi Teraoka, Kani (JP); Tatsuya Masamura, Kani (JP)

(73) Assignee: KAYABA INDUSTRY CO., LTD., Tokyo (JP)

( * ) Notice: Subject to any disclaimer, the term of this patent is extended or adjusted under 35 U.S.C. 154(b) by 516 days.

(21) Appl. No.: 12/991,768

(22) PCT Filed: Oct. 30, 2009

(86) PCT No.: PCT/JP2009/069012
§ 371 (c)(1),
(2), (4) Date: Nov. 9, 2010

(87) PCT Pub. No.: WO2010/084658
PCT Pub. Date: Jul. 29, 2010

(65) Prior Publication Data
US 2011/0056783 A1    Mar. 10, 2011

(30) Foreign Application Priority Data

Jan. 23, 2009   (JP) ................................. 2009-012657

(51) Int. Cl.
*F16F 9/512*  (2006.01)
*F16F 9/516*  (2006.01)

(52) U.S. Cl.
CPC ............... *F16F 9/5126* (2013.01); *F16F 9/516* (2013.01)

(58) Field of Classification Search
CPC ................................. F16F 9/5126; F16F 9/516
USPC ............... 188/280, 281, 282.1, 282.5, 282.6, 188/282.8, 282.9, 313, 316, 317, 322.15
See application file for complete search history.

(56) References Cited

U.S. PATENT DOCUMENTS

| | | | | |
|---|---|---|---|---|
| 3,570,635 A | * | 3/1971 | Takagi | 188/280 |
| 5,042,624 A | * | 8/1991 | Furuya et al. | 188/280 |
| 5,129,488 A | * | 7/1992 | Furuya et al. | 188/282.6 |
| 5,207,300 A | * | 5/1993 | Engel et al. | 188/266.2 |
| 5,248,014 A | * | 9/1993 | Ashiba | 188/282.8 |
| 5,368,142 A | * | 11/1994 | Ashiba et al. | 188/282.1 |
| 5,386,892 A | * | 2/1995 | Ashiba | 188/282.8 |
| 5,404,973 A | * | 4/1995 | Katoh et al. | 188/282.1 |

(Continued)

FOREIGN PATENT DOCUMENTS

| | | | | | |
|---|---|---|---|---|---|
| JP | 58116212 A | * | 7/1983 | | B60G 17/08 |
| JP | 59097338 A | * | 6/1984 | | F16F 9/50 |

(Continued)

*Primary Examiner* — Robert A Siconolfi
*Assistant Examiner* — Charles Poon
(74) *Attorney, Agent, or Firm* — Rabin & Berdo, P.C.

(57) ABSTRACT

A shock absorbing device includes a cylinder. A partition wall member is inserted into the cylinder to be free to slide and partitions an interior of the cylinder into two operating chambers. A passage connects the two operating chambers. A free piston is inserted into a pressure chamber to be free to slide and partitions the pressure chamber into one chamber that communicates with one operating chamber via a one side flow passage and another chamber that communicates with the other operating chamber via another side flow passage. A spring element generates a biasing force for suppressing displacement of the free piston relative to the pressure chamber. One or both of a bypass flow passage that connects the other chamber and the one operating chamber and a bypass flow passage that connects the one chamber and the other operating chamber is provided. A relief valve is provided in the bypass flow passage.

12 Claims, 13 Drawing Sheets

(56) References Cited

U.S. PATENT DOCUMENTS

| | | | |
|---|---|---|---|
| 5,529,154 A * | 6/1996 | Tanaka | 188/282.6 |
| 2006/0283675 A1 * | 12/2006 | Teraoka et al. | 188/298 |
| 2013/0008750 A1 * | 1/2013 | Piotrowski et al. | 188/313 |

FOREIGN PATENT DOCUMENTS

| | | | | |
|---|---|---|---|---|
| JP | 62-106138 A | | 5/1987 | |
| JP | 03061743 A | * | 3/1991 | F16F 9/50 |
| JP | 05-164173 A | | 6/1993 | |
| JP | 06147252 A | * | 5/1994 | F16F 9/50 |
| JP | 06272730 A | * | 9/1994 | F16F 9/44 |
| JP | 08135715 A | * | 5/1996 | F16F 9/50 |
| JP | 09196107 A | * | 7/1997 | F16F 9/50 |
| JP | 2006-336816 A | | 12/2006 | |
| JP | 2007-078004 A | | 3/2007 | |
| JP | 2008-215460 A | | 9/2008 | |
| JP | 2008-215462 A | | 9/2008 | |
| JP | 2008215462 A | * | 9/2008 | |
| JP | 2012057746 A | * | 3/2012 | |

* cited by examiner

SHOCK ABSORBING DEVICE

TECHNICAL FIELD

This invention relates to a shock absorbing device.

BACKGROUND ART

A shock absorbing device described in JP2006-336816A and JP2007-78004A includes a cylinder, a piston that is inserted into the cylinder to be free to slide and partitions the interior of the cylinder into an upper chamber and a lower chamber, a first flow passage provided in the piston to connect the upper chamber and the lower chamber, a second flow passage that opens onto a side portion of a piston rod from a tip end thereof and connects the upper chamber and the lower chamber, a housing that is attached to the tip end of the piston rod and includes a pressure chamber connected to a midway point of the second flow passage, a free piston that is inserted into the pressure chamber to be free to slide and partitions the pressure chamber into a one chamber and the other chamber, and a coil spring that biases the free piston. Thus, the one chamber of the pressure chamber communicates with the lower chamber via the second flow passage and the other chamber of the pressure chamber communicates with the upper chamber via the second flow passage.

In the shock absorbing device described above, the pressure chamber is partitioned into the one chamber and the other chamber by the free piston, and therefore the upper chamber and the lower chamber do not communicate directly via the second flow passage. However, when the free piston moves, a volume ratio between the one chamber and the other chamber varies such that a liquid in the pressure chamber travels between the upper chamber and the lower chamber in accordance with a movement amount of the free piston, and therefore it appears as if the upper chamber and the lower chamber are connected via the second flow passage.

Here, when a differential pressure between the upper chamber and the lower chamber during expansion and contraction of the shock absorbing device is set as P, a flow rate of liquid flowing out from the upper chamber is set as Q, a coefficient expressing a relationship between the differential pressure P and a flow rate Q1 of liquid passing through the first flow passage is set as C1, a pressure in the other chamber of the pressure chamber is set as P1, a coefficient expressing a relationship between a difference between the differential pressure P and the pressure P1 and a flow rate Q2 of liquid flowing into the other chamber of the pressure chamber from the upper chamber is set as C2, a pressure in the one chamber of the pressure chamber is set as P2, a coefficient expressing a relationship between the pressure P2 and a flow rate Q2 of liquid flowing into the lower chamber from the one chamber is set as C3, a sectional area serving as a pressure receiving surface area of the free piston is set as A, a displacement of the free piston relative to the pressure chamber is set as X, and a spring constant of the coil spring is set as K, and a transfer function of the differential pressure P relative to the flow rate Q is determined, Equation (1) is obtained. It should be noted that in Equation (1), s denotes a Laplace operator.

$$G(s) = \frac{P(s)}{Q(s)} = \frac{C1\{1 + A^2(C2 + C3)s/K\}}{1 + A^2(C1 + C2 + C3)s/K} \quad (1)$$

Further, when $j\omega$ is substituted for the Laplace operator s in the transfer function shown in Equation (1) and an absolute value of a frequency transfer function $G(j\omega)$ is determined, Equation (2) is obtained.

$$|G(j\omega)| = \frac{C1[K^4 + K^2A^4\{2(C2+C3)(C1+C2+C3) + C1^2\}\omega^2 + A^8(C2+C3)^2(C1+C2+C3)^2\omega^4]^{\frac{1}{2}}}{K^2 + A^4(C1+C2+C3)^2\omega^2} \quad (2)$$

On the basis of the above equations, a frequency characteristic of the transfer function of the differential pressure P relative to the flow rate Q in this shock absorbing device is as shown by a Bode diagram in FIG. 12. A transfer gain has $Fa=K/\{2\times\pi\times A2\times(C1+C2+C3)\}$ and $Fb=K/\{2\times\pi\times A2\times(C2+C3)\}$ as crossover frequencies, varies so as to be substantially C1 in a region where F<Fa and decrease gradually from C1 to $C1\times(C2+C3)/(C1+C2+C3)$ in a region where Fa≤F≤Fb, and is constant in a region where F>Fb. In other words, the frequency characteristic of the transfer function of the differential pressure P relative to the flow rate Q is such that the transfer gain increases in a low frequency region and decreases in a high frequency region.

Hence, in this shock absorbing device, as shown by a damping characteristic in FIG. 13, a large damping force can be generated in response to the input of low frequency vibration, and a small damping force can be generated in response to the input of high frequency vibration. Therefore, in a situation where the input vibration frequency is low, such as when a vehicle turns, a high damping force can be generated reliably, and in a situation where the input vibration frequency is high, such as when the vehicle travels on an irregular road surface, a low damping force can be generated reliably. As a result, an improvement in passenger comfort can be obtained in the vehicle.

DISCLOSURE OF THE INVENTION

As described above, a conventional shock absorbing device is useful in that an improvement in the passenger comfort of the vehicle can be achieved. However, a conventional shock absorbing device has the following problems.

To obtain a favorable damping characteristic in the conventional shock absorbing device described above, whereby a large damping force is generated in response to low frequency vibration and a small damping force is generated in response to high frequency vibration, the one chamber and the lower chamber are connected via an orifice that is provided in the housing to form a part of the second flow passage. Therefore, in a case where the piston operates at an extremely high speed, for example when the vehicle travels over a projection or the like, a flow passage resistance in the orifice may greatly exceed a flow passage resistance in the first flow passage, and as a result, the flow rate through the first flow passage may greatly exceed the flow rate through the second flow passage, making it impossible to realize a reduction in the generated damping force.

Hence, when the piston speed is high in a conventional shock absorbing device, the damping force may remain high, and as a result, vibration transfer from an axle side to a vehicle body side may be suppressed less favorably, leading to a reduction in the passenger comfort of the vehicle.

This invention has been designed to improve the defect described above, and an object thereof is to provide a shock absorbing device with which a damping force can be reduced even when a piston speed is high, enabling an improvement in the passenger comfort of a vehicle.

This invention is a shock absorbing device including: a cylinder; a partition wall member that is inserted into the cylinder to be free to slide and partitions an interior of the cylinder into two operating chambers; a passage that connects the two operating chambers; a pressure chamber; a free piston that is inserted into the pressure chamber to be free to slide and partitions the pressure chamber into a one chamber that communicates with one operating chamber via a one side flow passage and an other chamber that communicates with the other operating chamber via an other side flow passage; and a spring element that generates a biasing force for suppressing displacement of the free piston relative to the pressure chamber, wherein one or both of a bypass flow passage that connects the other chamber and the one operating chamber and a bypass flow passage that connects the one chamber and the other operating chamber is provided, and a relief valve is provided in the bypass flow passage.

In the shock absorbing device according to this invention, a gradient of a damping force relative to a piston speed can be reduced even in situations where the piston speed is high, such as when the vehicle travels over a projection, and therefore the damping force can be reduced reliably. Hence, in contrast to a conventional shock absorbing device, in which the damping force remains high such that vibration transfer from the axle to the vehicle body cannot be suppressed favorably, an improvement in the passenger comfort of the vehicle can be achieved.

Further, in the shock absorbing device according to this invention, when the piston speed is low, the damping force can be increased in response to low-frequency vibration and reduced in response to high-frequency vibration, and thus, a damping force of an appropriate magnitude can be generated in accordance with the frequency. As a result, the attitude of the vehicle can be stabilized when the vehicle turns, thereby preventing passengers from feeling anxious, and vibration transfer from the axle side to the vehicle body side can be suppressed, thereby improving the passenger comfort of the vehicle.

BEST MODES FOR CARRYING OUT THE INVENTION

Figure 1:
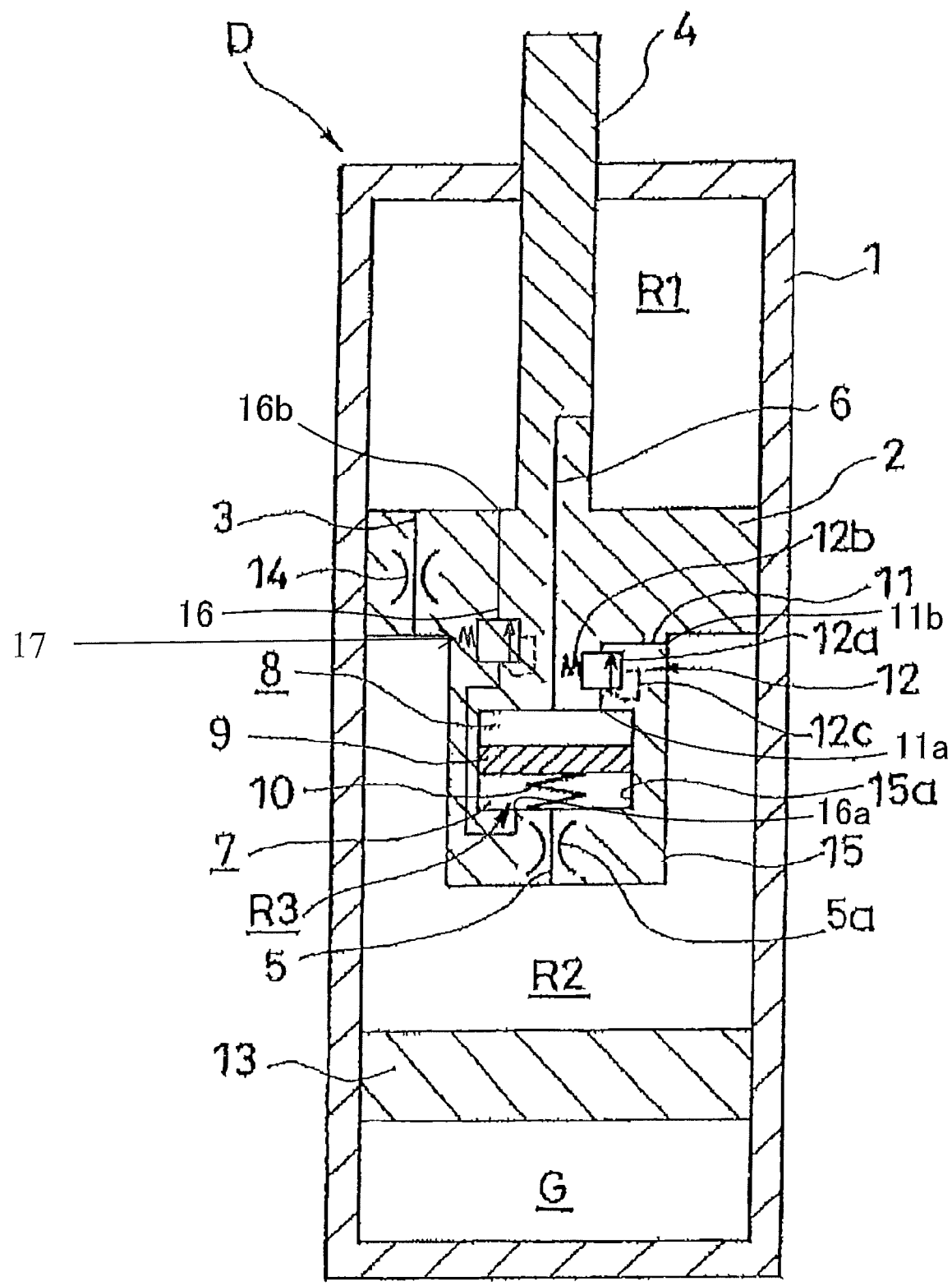
FIG. 1 is a longitudinal sectional view of a shock absorbing device according to an embodiment.

This invention will be described below on the basis of the figures. As shown in FIG. 1, a shock absorbing device D according to this invention is constituted by a cylinder 1, a piston 2 that is inserted into the cylinder 1 to be free to slide and serves as a partition wall member that partitions the interior of the cylinder 1 into two operating chambers, namely an upper chamber R1 and a lower chamber R2, a passage 3 that connects the upper chamber R1 and the lower chamber R2, a pressure chamber R3, a free piston 9 that is inserted into the pressure chamber R3 to be free to slide and partitions the pressure chamber R3 into a one chamber 7 that communicates with the lower chamber R2 via a one side flow passage 5 and an other chamber 8 that communicates with the upper chamber R1 via an other side flow passage 6, a spring element 10 that generates a biasing force to suppress displacement of the free piston 9 relative to the pressure chamber R3, a bypass flow passage 11 that connects the other chamber 8 and the lower chamber R2, and a relief valve 12 provided in the bypass flow passage 11. The shock absorbing device D is interposed between a vehicle body and an axle of a vehicle to generate a damping force for suppressing vehicle body vibration.

A fluid such as working oil is charged into the upper chamber R1, the lower chamber R2, and the pressure chamber R3, and a sliding partition wall 13 that separates the lower chamber R2 from an air chamber G by contacting an inner periphery of the cylinder 1 slidingly is provided in the cylinder 1 on a lower side of the figure.

It should be noted that a liquid such as water or an aqueous solution, for example, may be used instead of working oil as the fluid charged into the upper chamber R1, lower chamber R2, and pressure chamber R3.

Further, the piston 2 is joined to one end of a piston rod 4 inserted into the cylinder 1 to be free to slide, and the piston rod 4 projects outwardly from an upper end portion of the cylinder 1 in the figure. The interior of the cylinder 1 is maintained in a watertight condition by a seal, not shown in the figure, provided between the piston rod 4 and the cylinder 1. Furthermore, the shock absorbing device D is a so-called single rod type device, and it is therefore necessary to compensate for the volume of the piston rod 4 that enters and exits the cylinder 1 as the shock absorbing device D expands and contracts. However, this volume is compensated for when a volume of air of in the air chamber G expands or contracts as the sliding partition wall 13 moves in a vertical direction of FIG. 1. The shock absorbing device D is set as a single cylinder type device, but instead of providing the sliding partition wall 13 and the air chamber G, a reservoir may be provided on an outer periphery or outside of the cylinder 1 such that the volume of the piston rod 4 is compensated for by the reservoir. Further, the shock absorbing device D may be a double rod type device rather than a single rod type device.

Furthermore, a damping force generating element 14 such as an orifice or a leaf valve may be provided at a midway point in the passage 3 to apply resistance to the flow of fluid passing through the passage 3. The damping force generating element 14 is not shown in detail in the figure, but is formed by disposing a conventional orifice in parallel with a conventional leaf valve. Instead of disposing an orifice and a leaf valve in parallel, the damping force generating element 14 may be formed by disposing a choke and a leaf valve in parallel, for example, or by employing another constitution.

The pressure chamber R3 is formed from a hollow portion 15a provided in a housing 15 that is joined to the bottom of the piston 2 so as to face the lower chamber R2. The free piston 9 is provided in the interior of the hollow portion 15a and contacts a side wall of the hollow portion 15a to be capable of moving through the hollow portion 15a in the vertical direction of FIG. 1, and the free piston 9 partitions the hollow portion 15a into the one chamber 7 on the lower side of FIG. 1 and the other chamber 8 on the upper side of FIG. 1. In other words, the free piston 9 is inserted into the pressure chamber R3 to be free to slide, and is capable of displacing in the vertical direction of FIG. 1 relative to the pressure chamber R3.

Further, the free piston 9 is joined to one end of the spring element 10, another end of which is joined to a lower end portion of the hollow portion 15a forming the pressure chamber R3. Thus, the free piston 9 is positioned in a predetermined position of the pressure chamber R3 such that when the free piston 9 displaces relative to the pressure chamber R3 from this positioned position (to be referred to simply as a "neutral position" hereafter), a biasing force that is commensurate with the displacement amount is applied thereto by the spring element 10. It should be noted that the neutral position is a position in which the free piston 9 is positioned relative to the pressure chamber R3 by the spring element 10, and does not necessarily have to be set at an intermediate vertical direction point of the hollow portion 15a.

The pressure chamber R3 is divided vertically into the one chamber 7 and the other chamber 8 by the free piston 9 such that an expansion/contraction direction of the shock absorbing device D matches a movement direction of the free piston 9. Therefore, when the entire shock absorbing device D vibrates in the vertical direction of FIG. 1, vertical direction vibration is excited in the free piston 9 relative to the pressure chamber R3. To avoid this vibration, the movement direction of the free piston 9 may be set as an orthogonal direction to the expansion/contraction direction of the shock absorbing device D, or in other words a left-right direction of FIG. 1, such that the one chamber 7 and the other chamber 8 are disposed in a lateral direction of FIG. 1.

Further, a throttle 5a may be provided in the one side flow passage 5 connecting the lower chamber R2 and the one chamber 7 such that resistance is applied to a flow of fluid passing through the throttle 5a.

Furthermore, the other side flow passage 6 connecting the upper chamber R1 and the other chamber 8 opens onto a side portion of the piston rod 4 facing the upper chamber R1 and extends from the upper chamber R1 to the other chamber 8 via the piston 2 and the housing 15.

When a movement speed of the piston 2 relative to the cylinder 1 reaches a high speed during an expansion/contraction stroke of the shock absorbing device D, a differential pressure between the upper chamber R1 and the lower chamber R2 increases, leading to a great increase in the resistance applied by the throttle 5a in the one side flow passage 5 to the flow of fluid passing through the throttle 5a. As a result, resistance to a flow of fluid attempting to move from the one chamber 7 into the lower chamber R2 or from the lower chamber R2 into the one chamber 7 greatly exceeds the resistance to the flow of fluid passing through the passage 3, and therefore a damping force is substantially controlled by the resistance to the flow of fluid passing through the passage 3.

Hence, in order to reduce the damping force generated when the movement speed of the piston 2 relative to the cylinder 1 reaches a high speed, the bypass flow passage 11 connecting the other chamber 8 and the lower chamber R2 is provided in the housing 15. Further, the relief valve 12, which uses a pressure of the other chamber 8 as a pilot pressure, is provided in the bypass flow passage 11. The relief valve 12 is constituted by a valve main body 12a, a spring 12b that biases the valve main body 12a in a direction for closing the bypass flow passage 11, and a pilot passage 12c that causes the pressure of the other chamber 8 to act on the valve main body 12a in a direction opposing the biasing force of the spring 12b. When the piston speed during expansion of the shock absorbing device D reaches a high speed such that the pressure of the other chamber 8 reaches a predetermined pressure, a force exerted on the valve main body 12a by the pilot pressure overcomes the biasing force of the spring 12b, and as a result, the valve main body 12a moves in a direction for compressing the spring 12b. Accordingly, the bypass flow passage 11 is opened such that the other chamber 8 communicates with the lower chamber R2, and thus the pressure in the other chamber 8 can escape into the lower chamber R2.

Next, an operation of the shock absorbing device D will be described. First, an operation performed when the piston speed during expansion/contraction of the shock absorbing device D is low such that the relief valve 12 in the bypass flow passage 11 does not open will be described. In this case, when the piston 2 moves vertically in FIG. 1 relative to the cylinder 1 as the shock absorbing device D expands and contracts, one of the upper chamber R1 and the lower chamber R2 is compressed by the piston 2 while the other is expanded, and therefore the pressure of the compressed chamber, from among the upper chamber R1 and the lower chamber R2, increases while the pressure of the expanded chamber (the chamber that is increased in volume) from among the upper chamber R1 and the lower chamber R2 decreases simultaneously. As a result, a differential pressure is generated between the two chambers. Accordingly, the fluid on the compressed side of the one chamber R1 and the other chamber R2 moves to the expanded side of the one chamber R1 and the other chamber R2 via the passage 3 and a flow passage constituted by the other side flow passage 6, the other chamber 8, the one chamber 7, and the one side flow passage 5.

Assuming that an input speed of the shock absorbing device D during an expansion stroke is identical upon low frequency input and high frequency input, an operation performed upon low frequency input will be described first. In this case, an input amplitude is large, and therefore a flow rate of the fluid that moves from the upper chamber R1 to the lower chamber R2 in a single period increases. The displacement amount of the free piston 9 increases substantially in proportion with the flow rate, but since the free piston 9 is biased by the spring element 10, the biasing force received by the free piston 9 from the spring element 10 increases as the displacement amount of the free piston 9 increases, and therefore the pressure in the one chamber 7 of the pressure chamber falls below the pressure of the other chamber 8 correspondingly. When the pressure of the one chamber 7 decreases, a differential pressure between the one chamber 7 and the lower chamber R2 decreases, leading to a reduction in the flow rate through the throttle 5a. The flow rate of the passage 3 increases in proportion to the reduction in the flow rate through the throttle 5a, and therefore the damping force remains large.

Conversely, during high frequency input, the input amplitude is small, and therefore the flow rate of the fluid that moves from the upper chamber R1 to the lower chamber R2 in a single period decreases, leading to a reduction in the displacement of the moving free piston 9. Accordingly, the biasing force received by the free piston 9 from the spring element 10 decreases such that the pressure in the one chamber 7 of the pressure chamber becomes substantially equal to the pressure of the other chamber 8. As a result, the differential pressure between the one chamber 7 and the lower chamber R2 remains large, and therefore the flow rate through the throttle 5a is greater than the flow rate at a low frequency. Hence, the flow rate of the passage 3 decreases correspondingly, leading to a reduction in the damping force.

Figure 2:
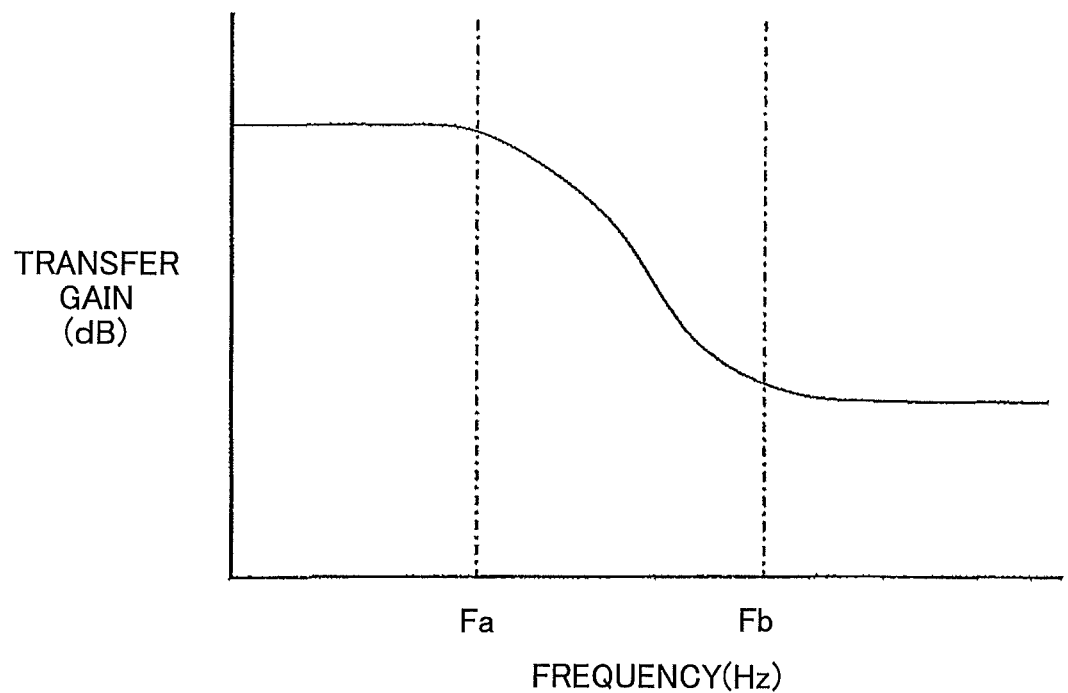
FIG. 2 is a Bode diagram showing a gain characteristic of a frequency transfer function of a pressure relative to a flow rate.
Figure 3:
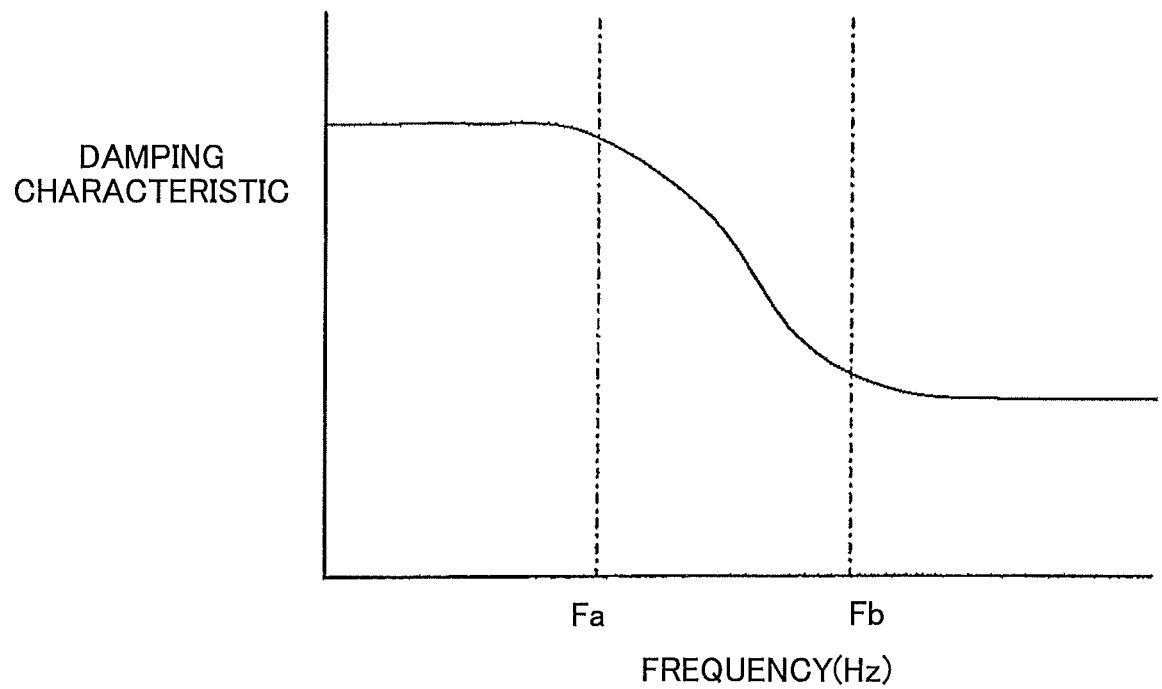
FIG. 3 is a view showing a damping characteristic of the shock absorbing device relative to a vibration frequency.

Therefore, when the piston speed is low, a frequency-related gain characteristic of a frequency transfer function of the differential pressure relative to the flow rate is identical to that of the conventional example represented by Equation (2), as shown in FIG. 2. Further, as shown in FIG. 3, according to a damping force characteristic of the shock absorbing device D, which expresses the gain of the damping force relative to the vibration frequency, a large damping force can be generated in response to vibration in a low frequency region and the damping force can be reduced in response to vibration in a high frequency region. As a result, variation in the damping force of the shock absorbing device D can be made dependent on the input vibration frequency.

On the other hand, in a situation where sudden large-amplitude vibration is input, such as when the vehicle travels over a projection, the movement speed of the piston 2 relative to the cylinder 1 increases irrespective of the input vibration frequency, and as a result, the flow rate of the fluid flowing from the upper chamber R1 to the lower chamber R2 increases. Accordingly, the fluid resistance of the throttle 5a greatly exceeds the fluid resistance of the passage 3, and therefore the damping force increases to a value set in accordance with the specifications of the damping force generating element 14 of the passage 3.

However, when the shock absorbing device D according to this embodiment performs an expansion operation such that the piston moves upward at a high piston speed, the pressure in the high-pressure upper chamber R1 is transmitted to the other chamber 8, causing the relief valve 12 to open, and as a result, the bypass flow passage 11 opens such that the upper chamber R1 communicates with the lower chamber R2 via the other side flow passage 6 and the other chamber 8.

Accordingly, the fluid moves from the upper chamber R1 to the lower chamber R2 not only through the passage 3, but also through a flow passage formed from the other side flow passage 6, the other chamber 8, and the bypass flow passage 11, and therefore an expansion side damping force generated by the shock absorbing device D can be reduced.

Figure 4:
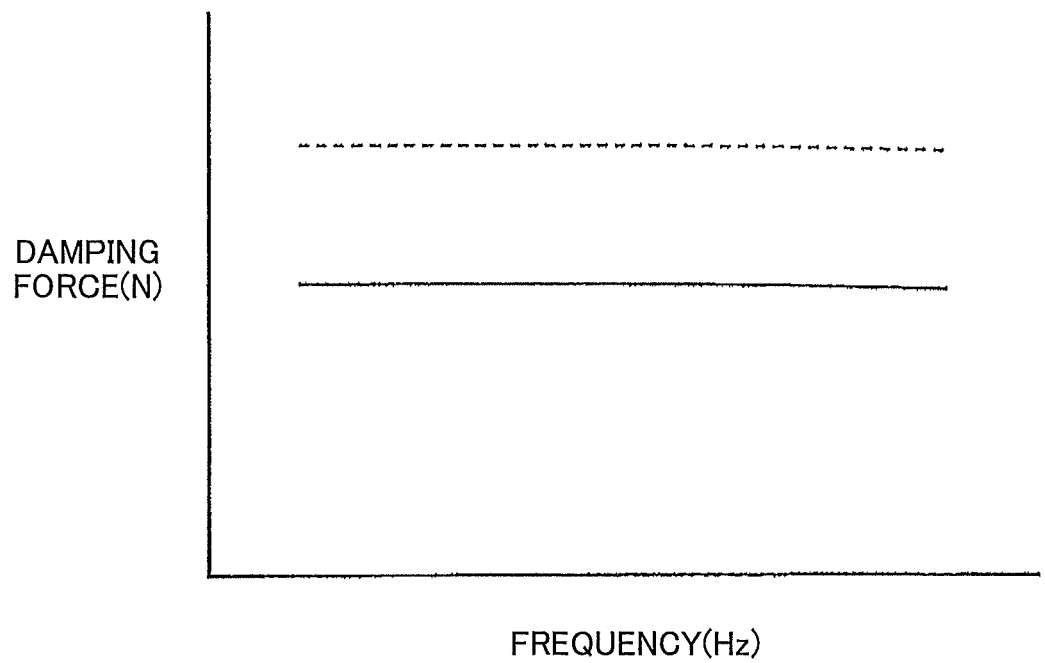
FIG. 4 is a view showing a characteristic of a damping force generated by the shock absorbing device relative to the vibration frequency in a case where the shock absorbing device expands and contracts while a piston speed is at a certain speed within a high speed region.
Figure 5:
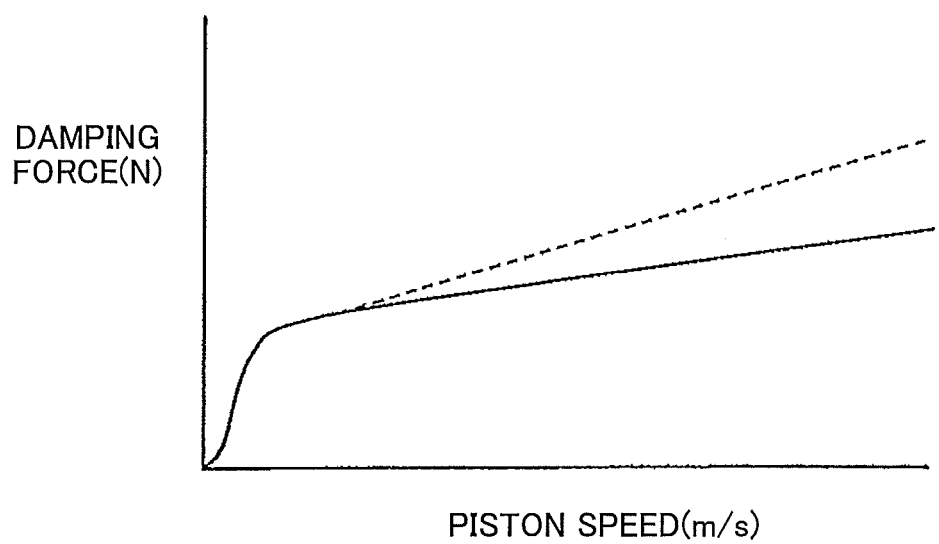
FIG. 5 is a view showing a characteristic of a damping force generated by the shock absorbing device relative to the piston speed in a case where the shock absorbing device vibrates at a certain vibration frequency.

FIGS. 4 and 5 are views showing damping force characteristics of the shock absorbing device, in which dotted lines indicate the damping characteristic of a conventional shock absorbing device and solid lines indicate the damping characteristic of the shock absorbing device D according to this embodiment. As shown in FIGS. 4 and 5, in a situation where the piston speed increases, for example when the vehicle travels over a projection, in the shock absorbing device D according to this embodiment, a gradient of the damping force relative to the piston speed can be reduced, and therefore the damping force can be reduced reliably. Hence, in contrast to the conventional shock absorbing device, in which the damping force remains high such that vibration transfer from the axle to the vehicle body cannot be suppressed favorably, an improvement in the passenger comfort of the vehicle can be achieved. With respect to vibration input in the low frequency region shown in FIG. 5, a damping characteristic generated in a very low piston speed region is set to rise when the fluid passes through the orifice of the damping force generating element 14 in the passage 3 preferentially, and the reason why an inflection point appears in the damping characteristic at a midway point in the low piston speed region is that when the leaf valve opens, a characteristic generated by the leaf valve becomes dominant.

Further, when the piston speed is in the very low speed region and the low speed region under vibration input in a high frequency region, a lower damping characteristic than the damping characteristic obtained under vibration input in the low frequency region, shown by the dotted line in FIG. 5, is obtained, and therefore a damping force of an appropriate magnitude corresponding to the frequency can be generated. By setting the value of a crossover frequency Fa, which is the smaller of crossover frequency values of a damping characteristic shown in FIG. 3, at or above the value of an above-spring resonance frequency of the vehicle and at or below the value of a below-spring resonance frequency of the vehicle, and setting the value of a crossover frequency Fb, which is the larger of the values, at or below the below-spring resonance frequency of the vehicle, the shock absorbing device D can generate a high damping force in response to vibration input at the above-spring resonance frequency, thereby stabilizing the attitude of the vehicle such that when the vehicle turns, passengers are prevented from feeling anxious. Moreover, a low damping force is invariably generated when vibration is input at the below-spring resonance frequency, and therefore the transfer of axle side vibration to the vehicle body side can be suppressed, enabling an improvement in the passenger comfort of the vehicle.

The damping force at a high piston speed may also be reduced by reducing the resistance of the damping force generating element 14 in the passage 3, but in so doing, the damping force that is generated in response to vibration in the low frequency region at a low piston speed decreases, and therefore the damping force may be insufficient, causing the passengers to feel anxious when the vehicle turns. With the shock absorbing device D according to this embodiment, on the other hand, the damping force generated at a high piston speed can be reduced without reducing the resistance of the damping force generating element 14 in the passage 3, and therefore this problem does not occur.

It should be noted that in this embodiment, the piston speed is compartmentalized into a low speed and a high speed for convenience to describe an operation of the relief valve 12, but the respective boundary speeds of these compartments may be set arbitrarily. Further, the piston speed at which the relief valve 12 opens, or in other words the piston speed forming the boundary between the low speed and the high speed, is preferably set at a piston speed at which a frequency dependence of the damping force disappears or a slightly higher speed than this piston speed. Furthermore, as a specific example of an operation to set a valve opening pressure of the relief valve, the piston speed at which the frequency dependence of the damping force disappears may be learned in advance, whereupon the valve opening pressure of the relief valve 12 is adjusted such that when the piston 2 displaces relative to the cylinder 1 at the learned piston speed, the relief valve 12 is opened using the internal pressure of the other chamber 8 as the pilot pressure, thereby opening the bypass flow passage 11.

Furthermore, in this embodiment, the other chamber 8, which increases in pressure when the shock absorbing device D expands, is connected to the lower chamber R2 by the bypass flow passage 11, and the relief valve 12 opens using the pressure of the other chamber 8 as the pilot pressure, and as a result, a reduction in damping force during the expansion operation of the shock absorbing device D is realized. Instead, however, the relief valve 12 may be provided in an opposite orientation to the orientation shown in FIG. 1 such that the relief valve 12 opens using the pressure of the lower chamber R2 as the pilot pressure. In this case, when piston speed is high as the shock absorbing device D contracts, the relief valve 12 is opened such that the pressure of the lower chamber R2 can escape into the upper chamber R1 via the bypass flow passage 11, and thus a reduction in damping force can be achieved during a contraction stroke of the shock absorbing device D.

Furthermore, the bypass flow passage 11 may be provided to connect the one chamber 7 to the upper chamber R1 such that the relief valve 12 opens using the pressure of the one chamber 7 as the pilot pressure, and a throttle may be provided in the other side flow passage 6 instead of the one side flow passage 5. Thus, when piston speed is high as the shock absorbing device D contracts, the relief valve 12 is opened such that the pressure of the lower chamber R2 can escape into the upper chamber R1 via the bypass flow passage 11, and as a result, a reduction in damping force can be achieved during the contraction stroke of the shock absorbing device D. Moreover, in a case where the one chamber 7 is connected to the upper chamber R1 by the bypass flow passage 11, as described above, a reduction in damping force can be achieved during the expansion stroke of the shock absorbing device D by orienting the relief valve 12 oppositely.

Furthermore, in addition to connecting the other chamber 8 and the lower chamber R2 via the bypass flow passage 11, the one chamber 7 and the upper chamber R1 are connected via a separate, independent bypass flow passage 16. Further, a relief valve 17 is provided in this independent bypass flow passage 16. Therefore, a reduction in damping force can be achieved during both the expansion stroke and the contraction stroke of the shock absorbing device D. The bypass flow passage 11 has a first end 11a that opens onto the other chamber 8 and a second end 11b that selectively opens onto the lower chamber R2. The bypass flow passage 16 has an other first end 16a that opens onto the one chamber 7 and an other second end 16b that selectively opens onto the upper chamber R1.

It should be noted that in the shock absorbing device D described above, the pressure chamber is formed inside the cylinder, but the pressure chamber may be provided on the outside of the cylinder.

An outline of the shock absorbing device D was described above. Below, the specific constitution of the shock absorbing device D will be described.

Figure 6:
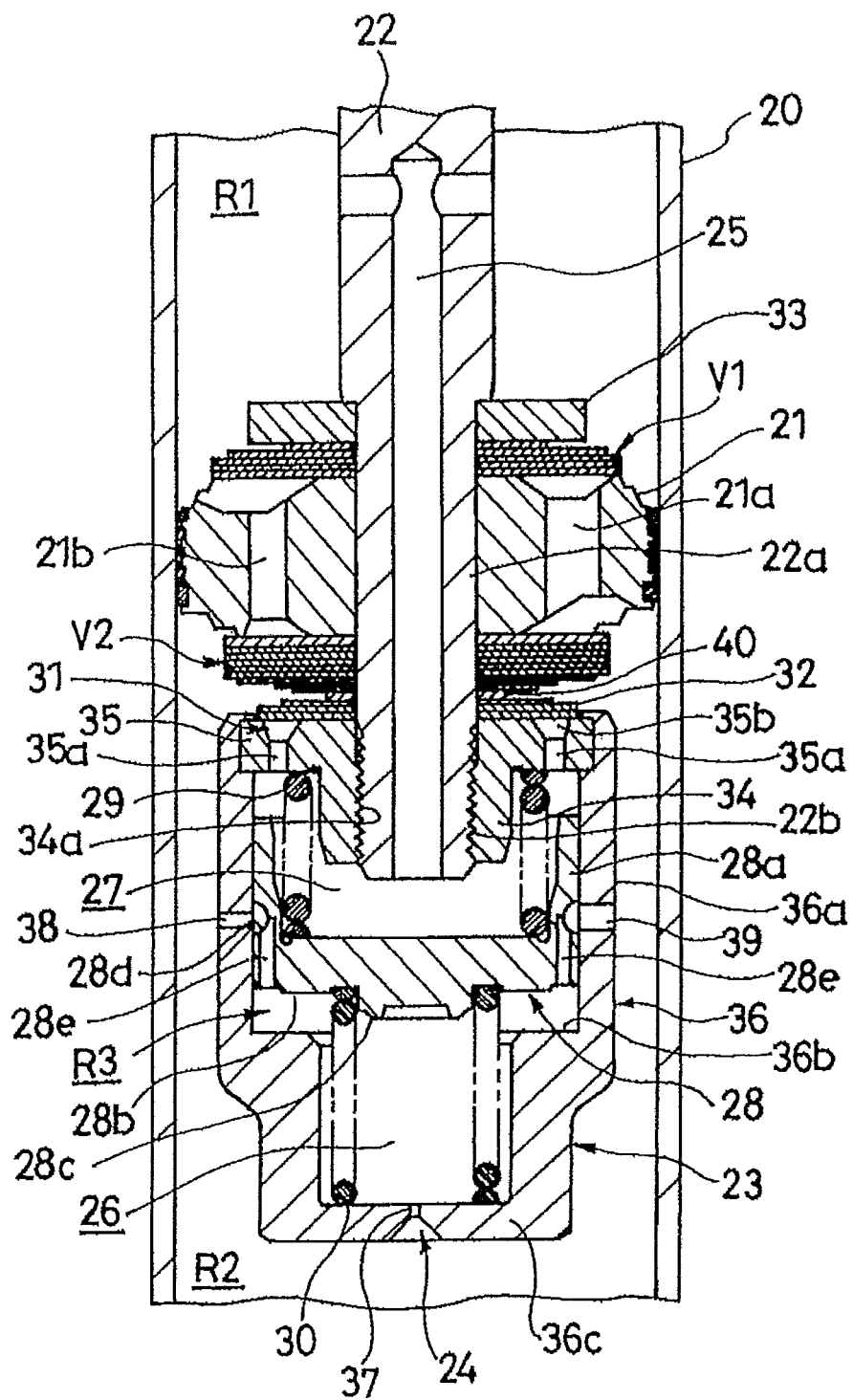
FIG. 6 is a partially enlarged longitudinal sectional view of a specific shock absorbing device.

Specifically, as shown in FIG. 6, the shock absorbing device D is constituted by a cylinder 20, a piston 21 that is inserted into the cylinder 20 to be free to slide and serves as a partition wall member partitioning the interior of the cylinder 20 into two operating chambers, namely the upper chamber R1 and the lower chamber R2, a piston rod 22 connected to the piston 21 at one end, passages 21a, 21b formed in the piston 21 to connect the upper chamber R1 and the lower chamber R2, a housing 23 that is fixed to a tip end of the piston rod 22 to form the pressure chamber R3, a free piston 28 that is inserted into the housing 23 to be free to slide and partitions the pressure chamber R3 into a one chamber 26 that communicates with the lower chamber R2 via a one side flow passage 24 and a other chamber 27 that communicates with the upper chamber R1 via a other side flow passage 25, a pair of coil springs 29, 30 accommodated in the one chamber 26 and the other chamber 27, respectively, to serve as spring elements that elastically support the free piston 28 from either side, a bypass flow passage 31 that connects the other chamber 27 and the lower chamber R2, and a relief valve 32 provided in the bypass flow passage 31. Although not shown in the figure, a sliding partition wall is provided below the cylinder 20 to form an air chamber, similarly to the shock absorbing device D shown in FIG. 1.

Each portion will now be described in detail. In the piston rod 22, a small diameter portion 22a is formed on a lower end side in FIG. 6 and a screw portion 22b is formed on a tip end side of the small diameter portion 22a.

The other side flow passage 25 is formed in the piston rod 22 so as to open onto the tip end of the small diameter portion 22a, pass through the interior of the piston rod 22, and exit onto a side portion of the piston rod 22. Although not shown in the figure, a valve such as a throttle that serves as resistance may be provided at a midway point in the other side flow passage 25.

The piston 21 is formed in an annular shape, and the small diameter portion 22a of the piston rod 22 is inserted into an inner peripheral side thereof. The passages 21a, 21b connecting the upper chamber R1 and the lower chamber R2 are provided in the piston 21 such that an upper end of the passage 21a in FIG. 6 is closed by a laminated leaf valve V1 serving as a damping force generating element and a lower end of the other passage 21b in FIG. 6 is closed by a laminated leaf valve V2 serving as a damping force generating element.

The laminated leaf valves V1, V2 are both formed in an annular shape, and the small diameter portion 22a of the piston rod 22 is inserted into an inner peripheral side thereof. The laminated valves V1, V2 are laminated onto the piston 21 together with an annular valve stopper 33 that limits a deformation amount of the laminated leaf valve V1.

When the shock absorbing device D contracts, the laminated leaf valve V1 is deformed by the differential pressure between the lower chamber R2 and the upper chamber R1. As a result, the laminated leaf valve V1 opens, thereby opening the passage 21a such that resistance is applied to the flow of liquid moving from the lower chamber R2 to the upper chamber R1. When the shock absorbing device D expands, the passage 21a is closed. Meanwhile, in contrast to the laminated leaf valve V1, the laminated leaf valve V2 opens the passage 21b when the shock absorbing device D expands and closes the passage 21b when the shock absorbing device D contracts. In other words, the laminated leaf valve V1 is a damping force generating element that generates a contraction side damping force when the shock absorbing device D contracts, and the laminated leaf valve V2 is a damping force generating element that generates an expansion side damping force when the shock absorbing device D expands. Further, when the passages 21a, 21b are both closed by the laminated leaf valves V1, V2, the upper chamber R1 and lower chamber R2 are connected by a conventional orifice, not shown in the figure. The orifice is formed by providing a cutout in an outer periphery of the laminated leaf valves V1, V2 or providing a recess portion in a valve seat on which the laminated leaf valves V1, V2 are seated, for example.

Hence, when a one-way system is to be employed, as shown in the figure, the passages 21a, 21b are provided such that the liquid passes through the passages 21a, 21b only when the shock absorbing device D expands and contracts, respectively. When a bidirectional flow is to be permitted, however, only one of the passages 21, 21b need be provided.

The relief valve 32 is laminated onto the screw portion 22b of the piston rod 22 from the bottom of the laminated leaf valve V2, and the housing 23 forming the pressure chamber R3 is screwed to the screw portion 22b. By means of the housing 23, the piston 21, the laminated leaf valves V1, V2, the valve stopper 33, and the relief valve 32 are fixed to the piston rod 22. Hence, the housing 23 serves not only to form the pressure chamber R3 in its interior, but also to fix the piston 21 to the piston rod 22.

The housing 23 will now be described. The housing 23 is constituted by an inner tube 34 having a collar 35 that is screwed to the screw portion 22b of the piston rod 22, and an outer tube 36 having a closed-end tubular shape. An upper end opening portion of the outer tube 36 in FIG. 6 is attached to an outer periphery of the collar 35 by being swaged against the outer periphery of the collar 35, and as a result, the outer tube 36 and the inner tube 34 are integrated such that the pressure chamber R3 is defined in the lower chamber R2 by the inner tube 34 and the outer tube 36. When integrating the inner tube 34 and the outer tube 36, a method such as welding may be employed instead of the swaging method described above.

The free piston 28 is inserted into the pressure chamber R3, formed as described above, to be free to slide, whereby the pressure chamber R3 is partitioned into the upper side other chamber 27 and the lower side one chamber 26 in FIG. 6.

Further, the inner tube 34 includes the aforementioned collar 35, and a screw portion 34a is formed on an inner periphery of the inner tube 34 such that by screwing the screw portion 34a to the screw portion 22b of the piston rod 22, the housing 23 can be fixed to the small diameter portion 22a of the piston rod 22. Accordingly, an operation for screwing the housing 23 to the tip end of the piston rod 22 can be performed more easily by forming the outer periphery of the outer tube 36 with a sectional shape such as a partially cut away shape or a hexagonal shape rather than a perfectly circular shape.

Further, the collar 35 of the inner tube 34 is provided with a plurality of ports 35a that open onto a lower end thereof in FIG. 6, and an annular window 35b that opens onto an upper end thereof in FIG. 6 and communicates with the ports 35a. The ports 35a and the window 35b penetrate the collar 35, thereby forming the bypass flow passage 31 that connects the other chamber 27 to the lower chamber R2. It should be noted that the window 35b need not be provided, and instead, the ports 35a may be opened onto the upper end of the collar 35 in FIG. 6.

The window 35b is opened and closed by the relief valve 32, which is laminated onto the upper end of the collar 35 in FIG. 6, i.e. an operating chamber side of the collar 35. Specifically, the relief valve 32 is constituted by a leaf valve formed from a plurality of laminated annular plates.

A spacer 40 which is thicker and has a smaller outer diameter than the relief valve 32 and the laminated leaf valve V2 laminated onto the bottom of the piston 21 is interposed between the relief valve 32 and the laminated leaf valve V2 to prevent interference therebetween when the outer periphery of the laminated leaf valve V2 deforms downward while the outer periphery of the relief valve 32 deforms upward.

Further, an outer peripheral side of the collar 35 beyond the window 35b extends further upward in FIG. 6 than an inner peripheral side such that when the outer periphery of the relief valve 32 formed from a leaf valve deforms upward in FIG. 6, an initial load is applied to the relief valve 32. Accordingly, the relief valve 32 continues to close the bypass flow passage 31 until a force generated by the differential pressure between the other chamber 27 and the lower chamber R2 for deforming the relief valve 32 upward in FIG. 6 overcomes the initial load, and when the differential pressure between the other chamber 27 and the lower chamber R2 reaches a valve opening pressure, the outer periphery of the relief valve 32 deforms further upward in FIG. 6, thereby separating from the collar 35 such that the bypass flow passage 31 opens and the other chamber 27 communicates with the lower chamber R2. In other words, the relief valve 32 opens using the pressure of the other chamber 27 as a pilot pressure, and therefore functions as a pressure chamber side relief valve.

A lower end of the outer tube 36 in FIG. 6 is reduced in diameter such that a step portion 36b is formed in a tube portion 36a, and a fixed orifice 37 constituting a part of the one side flow passage 24 is provided in a bottom portion 36c of the outer tube 36.

The free piston 28, which is inserted into the pressure chamber R3 formed by the inner tube 34 and the outer tube 36 as described above, is formed in a closed-end tubular shape and includes a tube portion 28a, a bottom portion 28b that closes one end of the tube portion 28a, a projecting portion 28c provided on a lower end of the bottom portion 28b in FIG. 6 so as to project toward the bottom portion 36c of the outer tube 36, and an annular groove 28d formed in an outer periphery of the tube portion 28a. An inner side of the free piston 28 faces the inner tube 34, and the tube portion 28a contacts the inner periphery of the outer tube 36 slidingly, thereby partitioning the pressure chamber R3 into the one chamber 7 and the other chamber 8.

Further, the coil springs 29, 30 serving as spring elements are interposed, respectively, in the other chamber 27 between the collar 35 of the inner tube 34 and the bottom portion 28b inner side of the free piston 28 and in the one chamber 26 between the bottom portion 36c of the outer tube 36 and the bottom portion 28b outer side of the free piston 28. As a result, the free piston 28 is sandwiched between the coil springs 29, 30 from top and bottom and elastically supported so as to be positioned in a predetermined neutral position within the pressure chamber R3. Thus, a biasing force is applied to the free piston 28 in proportion to a displacement amount thereof relative to the housing 23, whereby displacement of the free piston 28 is suppressed.

It should be noted that as long as the free piston 28 can be elastically supported, a member other than the coil springs 29, 30 may be employed as the spring element. For example, an elastic body such as a plate spring may be used to provide elastic support to the free piston 28. Further, when a single spring element joined at one end to the free piston 28 is used, the other end thereof may be fixed to the inner tube 34 or the outer tube 36.

A lower end of the coil spring 29 in FIG. 6 is positioned in a radial direction by being fitted into an inner periphery of a deepest part of the bottom portion 28a of the free piston 28, and the coil spring 30 is centered by inserting the projecting portion 28c of the free piston 28 into an inner periphery of the coil spring 30. Thus, positional deviation of the coil springs 29, 30 relative to the free piston 28 can be prevented, and the biasing force can be applied to the free piston 28 with stability.

The inner periphery of the tube portion 28a of the free piston 28 has a larger diameter than the deepest portion, and therefore a wire of the coil spring 29 does not touch the inner periphery of the tube portion 28a when the coil spring 29 is compressed such that a coil diameter thereof increases. As a result, contamination in prevented.

Further, the projecting portion 28c functions to center the coil spring 30, as described above, and a height (vertical direction length in FIG. 6) of the projecting portion 28c is set at a sufficient height to prevent lifting of the coil spring 30 (separation of the coil spring 30 from the projecting portion 28c).

In addition to the constitution described above, the free piston 28 according to this embodiment includes a hole 28e that passes through the interior of the tube portion 28a and bottom portion 28b of the free piston 28 to connect the annular groove 28d and the one chamber 26.

Further, two variable orifices 38, 39 are provided in the tube portion 36a of the outer tube 36 to connect the lower chamber R2 to the interior of the outer tube 36, and whenever the free piston 28 is in the neutral position under the elastic support of the coil springs 29, 30, the variable orifices 38, 39 oppose the annular groove 28d so as to connect the one chamber 26 and the lower chamber R2. Further, when the free piston 28 displaces to a stroke end at a lower end of the inner tube 34 in FIG. 6, or in other words when the free piston 28 displaces until it comes into contact with the step portion 36b of the outer tube 36, the variable orifices 38, 39 are completely overlapped by the outer periphery of the tube portion 28a of the free piston 28 and thereby closed. Hence, the one side flow passage 24 is constituted by the annular groove 28d, the variable orifices 38, 39, the hole 28e, and the fixed orifice 37. It should be noted that although two variable orifices 38, 39 are provided, the number of variable orifices may be set as desired.

Hence, in the shock absorbing device D described above, when the displacement amount of the free piston 28 from the neutral position reaches an arbitrary displacement amount, the variable orifices 38, 39 begin to shift from a state of being completely open to the annular groove 28d toward a state of opposing the outer periphery of the tube portion 28a, whereby a flow passage sectional area of the variable orifices 38, 39 begins to decrease gradually, and accordingly, a flow passage resistance in the one side flow passage 24 gradually increases. The aforementioned arbitrary displacement amount is set in accordance with a vertical direction width of the annular groove 28d in FIG. 6 and an opening position of the variable orifices 38, 39 on the outer tube 36 inner periphery side. As the displacement amount of the free piston 28 increases, the flow passage sectional area of the variable orifices 38, 39 gradually decreases such that when the free piston 28 reaches the stroke end, the variable orifices 38, 39 completely oppose the tube portion 28a and are closed thereby. As a result, the flow passage resistance in the one side flow passage 24 reaches a maximum, whereby the one chamber 26 communicates with the lower chamber R2 via the fixed orifice 37 alone.

Operations of the shock absorbing device D having the above constitution will now be described.

(A) Operation of shock absorbing device D when displacement amount of free piston 28 from neutral position is within range in which variable orifices 38, 39 do not begin to close and relief valve 32 does not open In this case, the piston speed is low and the differential pressure between the other chamber 27 and the lower chamber R2 has not reached the valve opening pressure of the relief valve 32, and therefore the free piston 28 can displace without varying the resistance of the one side flow passage 24.

Considering a case in which the input speed of the shock absorbing device D remains constant while the input frequency is either low or high, when the input frequency is low, the input amplitude increases, and therefore the amplitude of the free piston 28 increases within the range in which the variable orifices 38, 39 do not begin to close.

When the amplitude of the free piston 28 increases within this range, the biasing force received by the free piston 28 from the coil springs 29, 30 increases, and as a result, the internal pressure of the one chamber 26 falls below the internal pressure of the other chamber 27 by an amount corresponding to the biasing force of the coil springs 29, 30.

Accordingly, the differential pressure between the one chamber 26 and the lower chamber R2 decreases, leading to a reduction in the flow rate through the one side flow passage 24.

Conversely, when the input frequency input into the shock absorbing device D is high, the input amplitude decreases, and therefore the amplitude of the free piston 28 decreases. When the amplitude of the free piston 28 decreases, the biasing force received by the free piston 28 from the coil springs 29, 30 decreases, and as a result, the internal pressure of the one chamber 26 becomes substantially equal to the internal pressure of the other chamber 27. Accordingly, the differential pressure between the one chamber 26 and the lower chamber R2 remains large, whereby the flow rate through the one side flow passage 24 also remains large.

In other words, when the input frequency input into the shock absorbing device D is low, the flow rate through the one side flow passage 24 is small, and when the input frequency is high, the flow rate through the one side flow passage 24 increases. If the input speed is constant, the flow rate from the upper chamber R1 to the lower chamber R2 must remain constant regardless of the input frequency, and therefore the flow rate through the laminated leaf valves V1, V2 in the passages 21a, 21b increases when the input frequency is low and decreases when the input frequency is high. Hence, as shown in FIG. 3, according to the damping characteristic of the shock absorbing device D, the damping force is high when the input frequency is low and low when the input frequency is high.

(B) Operation of shock absorbing device D when displacement amount of free piston 28 from neutral position is within range in which both variable orifices 38, 39 begin to close, thereby increasing flow passage resistance of one side flow passage 24, but relief valve 32 does not open In this case also, the piston speed is low and the differential pressure between the other chamber 27 and the lower chamber R2 has not reached the valve opening pressure of the relief valve 32, and therefore the free piston 28 displaces relative to the housing 23.

When the variable orifices 38, 39 begin to close in accordance with the displacement amount of the free piston 28, the flow passage sectional area gradually decreases, and when the free piston 28 reaches the stroke end, the variable orifices 38, 39 are completely closed such that the flow passage sectional area reaches a minimum, i.e. becomes identical to the flow passage sectional area of the fixed orifice 37.

In other words, once the free piston 28 begins to close the variable orifices 38, 39, the flow passage resistance of the one side flow passage 24 gradually increases in accordance with the displacement amount, and when the free piston 28 reaches the stroke end, the flow passage resistance reaches a maximum.

Here, the free piston 28 displaces to the stroke end when the amount of liquid flowing into or out of the one chamber 26 or the other chamber 27 is large, or more specifically when the amplitude of the vibration in the shock absorbing device D is large.

When the vibration frequency of the shock absorbing device D is comparatively high, the shock absorbing device D generates a comparatively low damping force until the free piston 28 displaces to a position in which the variable orifices 38, 39 begin to close, and when the free piston 28 displaces beyond the position in which the variable orifices 38, 39 begin to close, the flow passage resistance in the one side flow passage 24 gradually increases. As a result, a movement speed of the free piston 28 toward the stroke end side decreases, the amount of liquid moving between the upper chamber R1 and the lower chamber R2 via the pressure chamber R3 decreases, and the amount of liquid passing through the passages 21a, 21b increases correspondingly. Therefore, the damping force generated by the shock absorbing device D gradually increases.

When the free piston 28 reaches the stroke end, liquid movement between the upper chamber R1 and the lower chamber R2 via the pressure chamber R3 stops such that the liquid passes through only the passages 21a, 21b until the expansion/contraction direction of the shock absorbing device D reverses. Accordingly, the shock absorbing device D generates damping force at a maximum damping coefficient.

More specifically, even when high-frequency, large-amplitude vibration that causes the free piston 28 to displace to the stroke end is input into the shock absorbing device D, the damping force generated by the shock absorbing device D increases gradually from the point at which the displacement amount of the free piston 28 from the neutral position exceeds the arbitrary displacement amount to the point at which the free piston 28 reaches the stroke end, and therefore situations in which a low damping force varies rapidly to a high damping force are eliminated. In other words, rapid variation in the magnitude of the damping force does not occur when the free piston 28 reaches the stroke end such that liquid movement between the upper chamber R1 and the lower chamber R2 via the pressure chamber R3 stops, and therefore damping force variation from a low damping force to a high damping force occurs smoothly. Moreover, when the free piston 28 reaches the stroke end on either end side of the pressure chamber R3, the generated damping force increases gradually, and therefore rapid damping force variation can be suppressed during both the expansion stroke and the contraction stroke of the shock absorbing device D.

Hence, according to the shock absorbing device D, the generated damping force varies smoothly even when high-frequency, large-amplitude vibration is input, and therefore passengers do not experience shock due to damping force variation. Accordingly, an improvement in the passenger comfort of the vehicle can be achieved. In particular, situations in which the vehicle body vibrates due to rapid damping force variation, causing the engine hood to resonate such that noise is generated, can be prevented, and in this regard also, an improvement in the passenger comfort of the vehicle can be achieved.

As described above in (A) and (B), when the piston speed is high but the flow passage resistance through the fixed orifice 37 and the variable orifices 38, 39 is not excessive, the shock absorbing device D generates a damping force that is dependent on the vibration frequency. Further, when the free piston 28 displaces to the stroke end, the damping force increases gradually, and therefore damping force variation in which a decreasing damping force suddenly increases can be suppressed.

When the piston speed is high and the flow passage resistance through the fixed orifice 37 and the variable orifices 38, 39 is excessive, on the other hand, during the expansion stroke of the shock absorbing device D, the pressure of the other chamber 27 communicating with the compressed upper chamber R1 via the other side flow passage 25 increases such that the outer periphery of the relief valve 32 deforms so as to overcome the initial load, and as a result, the bypass flow passage 31 constituted by the ports 35a and the window 35b provided in the collar 35 opens.

Hence, the liquid moves from the upper chamber R1 to the lower chamber R2 not only through the passage 21b but also through the other side flow passage 25, the other chamber 27, and the bypass flow passage 31, enabling a reduction in the expansion side damping force generated by the shock absorbing device D.

Thus, with the shock absorbing device D according to this embodiment, in a situation where the piston speed increases, for example when the vehicle travels over a projection, the damping force gradient relative to the piston speed can be reduced, as shown by the solid lines in FIGS. 4 and 5, in contrast to the damping characteristic of the conventional shock absorbing device shown by the dotted lines in FIGS. 4 and 5, and as a result, the damping force can be reduced reliably. Therefore, in contrast to the conventional shock absorbing device, in which the damping force remains high such that vibration transfer from the axle to the vehicle body cannot be suppressed favorably, an improvement in the passenger comfort of the vehicle can be achieved.

Further, in the shock absorbing device D according to this embodiment, the pressure chamber R3 is provided in the housing 23 which is disposed inside the lower chamber R2 serving as one of the operating chambers and fixes the piston 21, which serves as a partition wall member fitted to the piston rod 22, to the piston rod 22 by being screwed to the piston rod 22 inserted into the cylinder 1. Further, the bypass flow passage 31 communicates with the other chamber 27 and the lower chamber R2 serving as one of the operating chambers. Hence, the housing 23 also functions as a piston nut, thereby facilitating formation of the pressure chamber R3 in the lower chamber R2 serving as one of the operating chambers, and disposal of the bypass flow passage 31 is also facilitated.

Moreover, the housing 23 comprises the inner tube 34 having the collar 35, and the closed-end tube shaped outer tube 36 attached to the outer periphery of the collar 35, and therefore the pressure chamber R3 can be formed while establishing the piston nut function through a simple structure.

Furthermore, the bypass flow passage 31 penetrates the collar 35 of the inner tube 34 to communicate with the other chamber 27 and the lower chamber R2 serving as one of the operating chambers, and the pressure chamber side relief valve 32 is formed such that the bypass flow passage is opened and closed by an annular leaf valve that is attached to the piston rod 22 and laminated to the lower chamber R2 side of the collar 35 provided on the inner tube 34. Hence, the relief valve 32 can be formed simply by fixing the leaf valve to the piston rod 22 via the housing 23. Moreover, since the relief valve 32 is constituted by a leaf valve, an axial direction length of the shock absorbing device D does not increase, and a stroke length thereof is not restricted.

Further, in the shock absorbing device D, the biasing force that returns the free piston 28 to the neutral position is applied by the coil springs 29, 30, and therefore a situation in which the function for making the damping force dependent on the input frequency cannot be exercised when required does not occur.

Next, referring to FIG. 7, a first modified example of the shock absorbing device will be described. The shock absorbing device according to this modified example differs from the shock absorbing device D shown in FIG. 6 in that a spring support 41 is interposed between an upper end serving as one end of the coil spring 29 accommodated in the other chamber 27 and the collar 35 of the inner tube 34. The spring support 41 includes a tube portion 41a fitted onto the outer periphery of the inner tube 34 and a spring support portion 41b extending from a lower end outer periphery of the tube portion 41a, an annular gap being provided between the outer periphery of the spring support portion 41b and the inner periphery of the outer tube 36 forming the housing 23.

Figure 7:
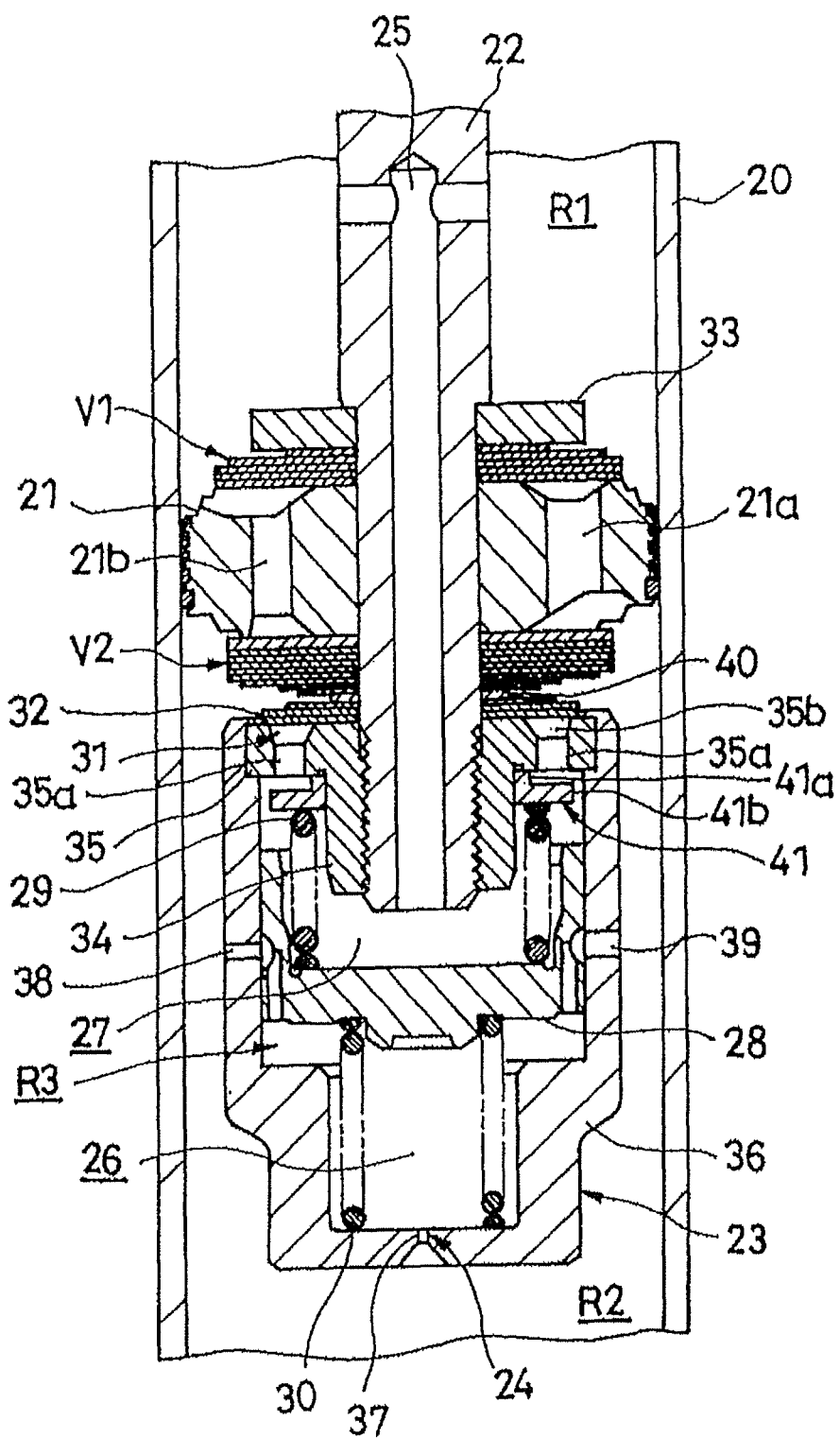
FIG. 7 is a partially enlarged longitudinal sectional view showing a first modified example of the specific shock absorbing device.

By using the spring support 41 to support the upper end of the coil spring 29, interference between the upper end of the coil spring 29 in FIG. 7 and the ports 35a provided in the collar 35, leading to partial or complete closure of the ports 35a, can be prevented. Hence, when the shock absorbing device expands and the piston speed is in the high speed region, the other chamber 27 and the lower chamber R2 serving as one of the operating chambers can be connected by the bypass flow passage 31 reliably and with a fixed flow passage sectional area, and therefore the damping force generated by the shock absorbing device can be reduced reliably and the reduced damping force can be stabilized. Furthermore, the coil spring 29 does not interfere with the ports 35a even if the inner diameter of the ports 35a is increased, and therefore the gradient of the generated damping force characteristic relative to the piston speed when the bypass flow passage 31 is open can be reduced even further.

Figure 8:
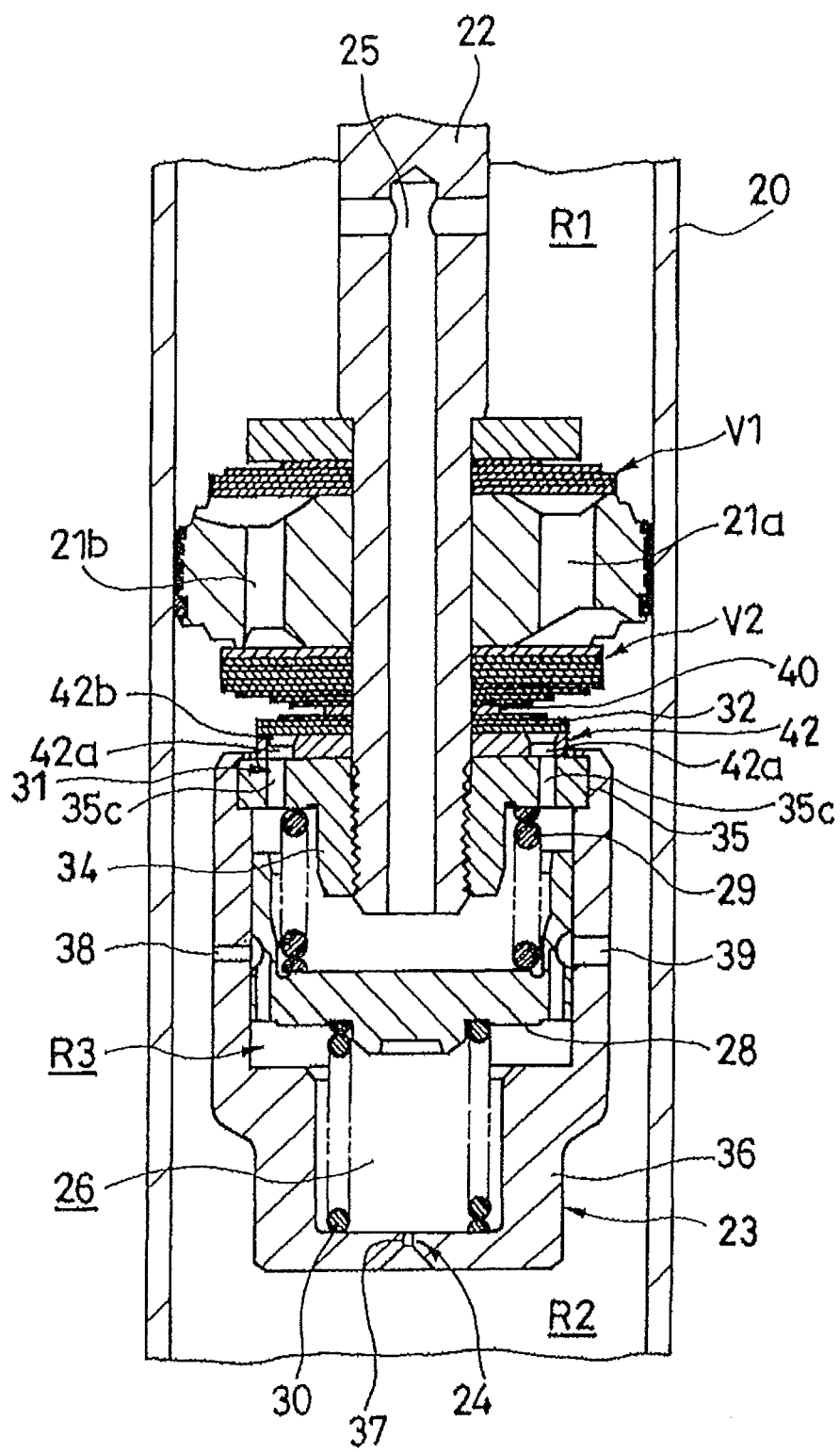
FIG. 8 is a partially enlarged longitudinal sectional view showing a second modified example of the specific shock absorbing device.

Referring to FIG. 8, a second modified example of the shock absorbing device will be described. The shock absorbing device according to this modified example differs from the shock absorbing device D shown in FIG. 6 in that an annular interposed member 42 forming a part of the bypass flow passage 31 is interposed between the collar 35 of the inner tube 34 forming the housing 23 and the leaf valve forming the relief valve 32.

The interposed member 42 is a thick disc-shaped member having holes, in which a plurality of ports 42a open downward in FIG. 8 and annular windows 42b communicating respectively with the plurality of ports 42a are provided above the ports 42a in FIG. 8.

Further, the collar 35 of the inner tube 34 is provided with a through hole 35c penetrating the collar 35 in place of the ports and window such that when the interposed member 42 is laminated onto the inner tube 34, the ports 42a connect the other chamber 27 in the housing 23 to the lower chamber R2 serving as one of the operating chambers via the through hole 35c in the collar 35. In other words, in the shock absorbing device according to the second modified example, the bypass flow passage 31 is constituted by the through hole 35c provided in the collar 35, the ports 42a and windows 42b of the interposed member 42.

It should be noted that the interposed member 42 may be laminated to the collar 35 including the ports 35a and the window 35b. In this case, the ports 42a can be connected to the window 35b reliably without positioning the inner tube 34 and the interposed member 42 in the circumferential direction, enabling an increase in convenience.

The interposed member 42 is provided with the ports 42a forming a part of the bypass flow passage 31, and therefore, by preparing interposed members 42 having differently shaped and sized ports 42a in advance and replacing the interposed member 42, the damping characteristic generated when the relief valve 32 opens the bypass flow passage 31 can be adjusted.

Figure 9:
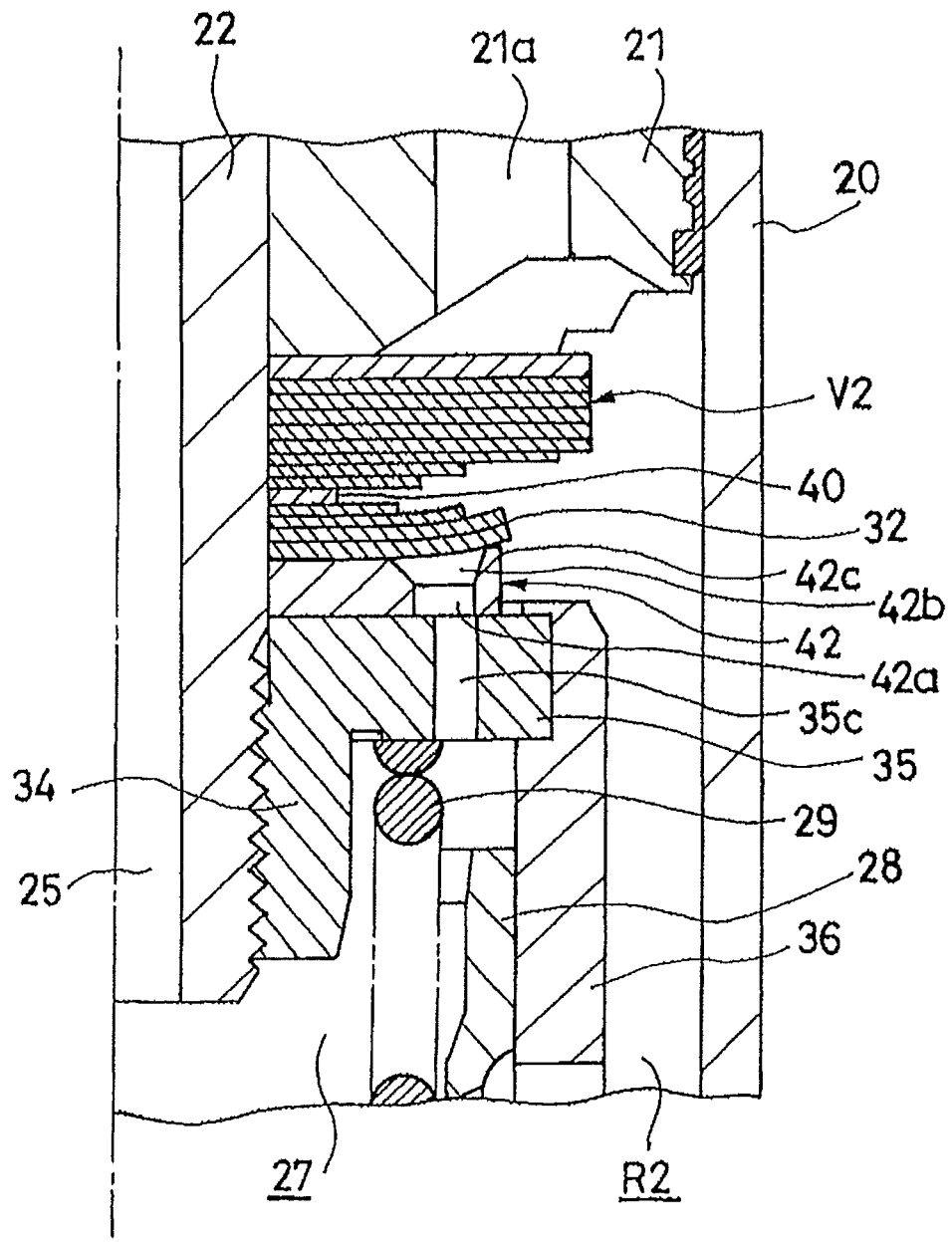
FIG. 9 is a partially enlarged longitudinal sectional view showing a third modified example of the specific shock absorbing device.

Further, as shown by a third modified example in FIG. 9, by providing an annular seat portion 42c on/from which the relief valve 32 sits/separates on the outer periphery of the window 42b in the interposed member 42 and preparing interposed members 42 having seat portions 42c of different heights in a vertical direction of FIG. 9, the height of the seat portion 42c can be modified by replacing the interposed member 42, and as a result, the initial load applied to the relief valve 32 can be modified. Thus, the valve opening pressure of the relief valve 32 can be adjusted.

Figure 10:
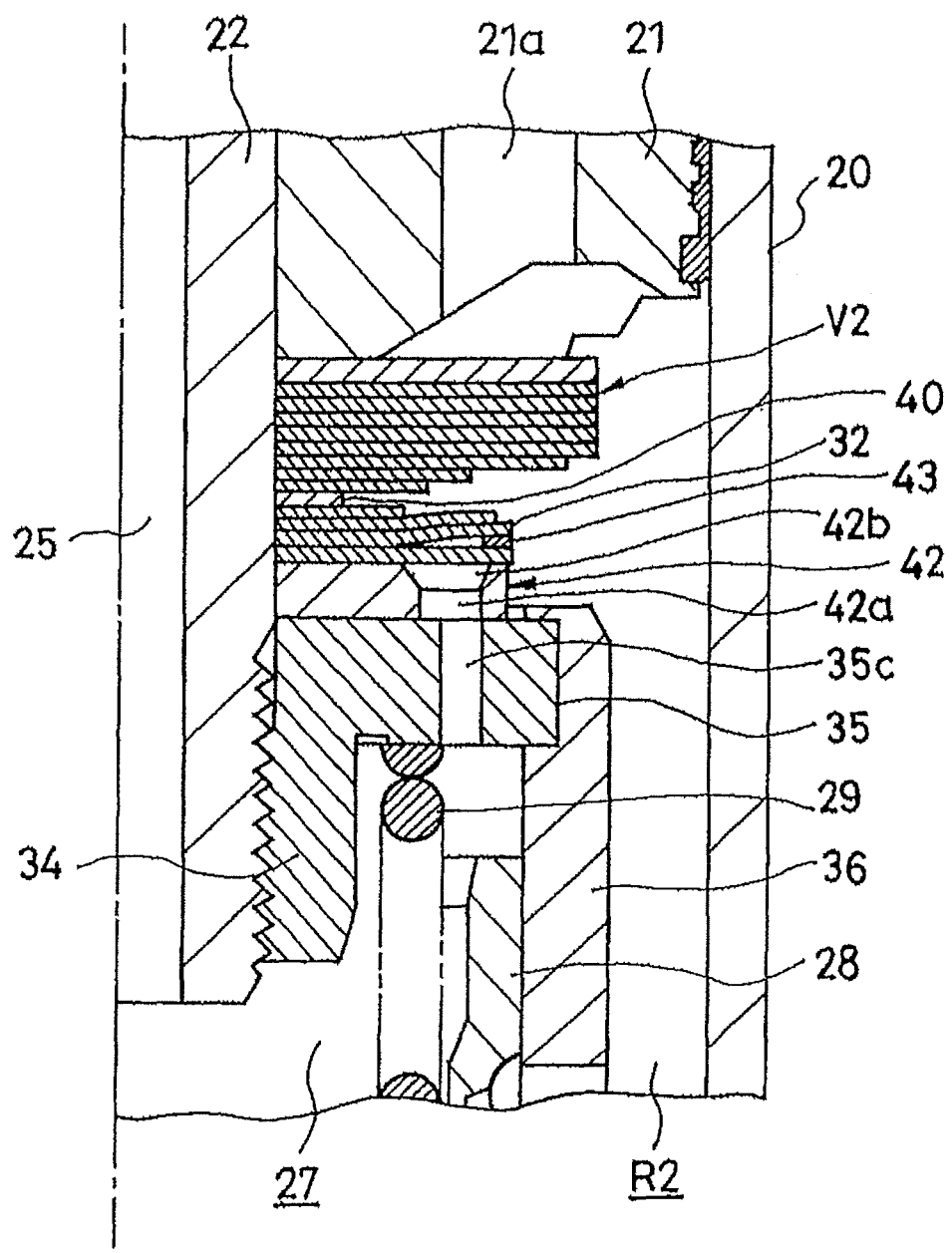
FIG. 10 is a partially enlarged longitudinal sectional view showing a fourth modified example of the specific shock absorbing device.

As described above, to apply the initial load determining the valve opening pressure to the relief valve 32, the entire relief valve 32 may be deformed in advance by causing a support position of the inner periphery serving as a fixed end and a support position in which the outer periphery serving as a free end closes the bypass flow passage 31 to deviate from each other in the axial direction. Alternatively, as shown by a fourth modified example in FIG. 10, the valve opening pressure of the relief valve 32 may be set by interposing a ring 43 between arbitrary annular plates of the leaf valve forming the relief valve 32 such that initial deformation is applied to the annular plates laminated to the upper side of FIG. 10 by the ring 43. In this case, the valve opening pressure can be modified by adjusting a plate thickness of the ring 43.

Finally, referring to FIG. 11, a fifth modified example of the shock absorbing device will be described. The shock absorbing device according to this modified example differs from the shock absorbing device D shown in FIG. 6 in the constitution of a relief valve 44.

More specifically, the relief valve 44 is constituted by an annular valve seat 35d that projects from the collar 35 of the inner tube 34 forming the housing 23 toward an end portion of the collar 35 on the side of the lower chamber R2 serving as one of the operating chambers, a small-diameter spacer 45 interposed between the inner tube 34 and the laminated leaf valve V2, an annular valve seat member 46 having a larger outer diameter than the spacer 45, and an annular leaf valve 47 that is ring shaped and has an inner peripheral upper surface which sits on a lower end of the valve seat member 46 and an outer peripheral lower surface which sits on an upper end of the valve seat 35d.

Further, in this shock absorbing device, the collar 35 is provided with only ports 35e and no windows such that the bypass flow passage 31 is constituted by the ports 35e connecting the other chamber 27 to the lower chamber R2 serving as one of the operating chambers.

Figure 11:
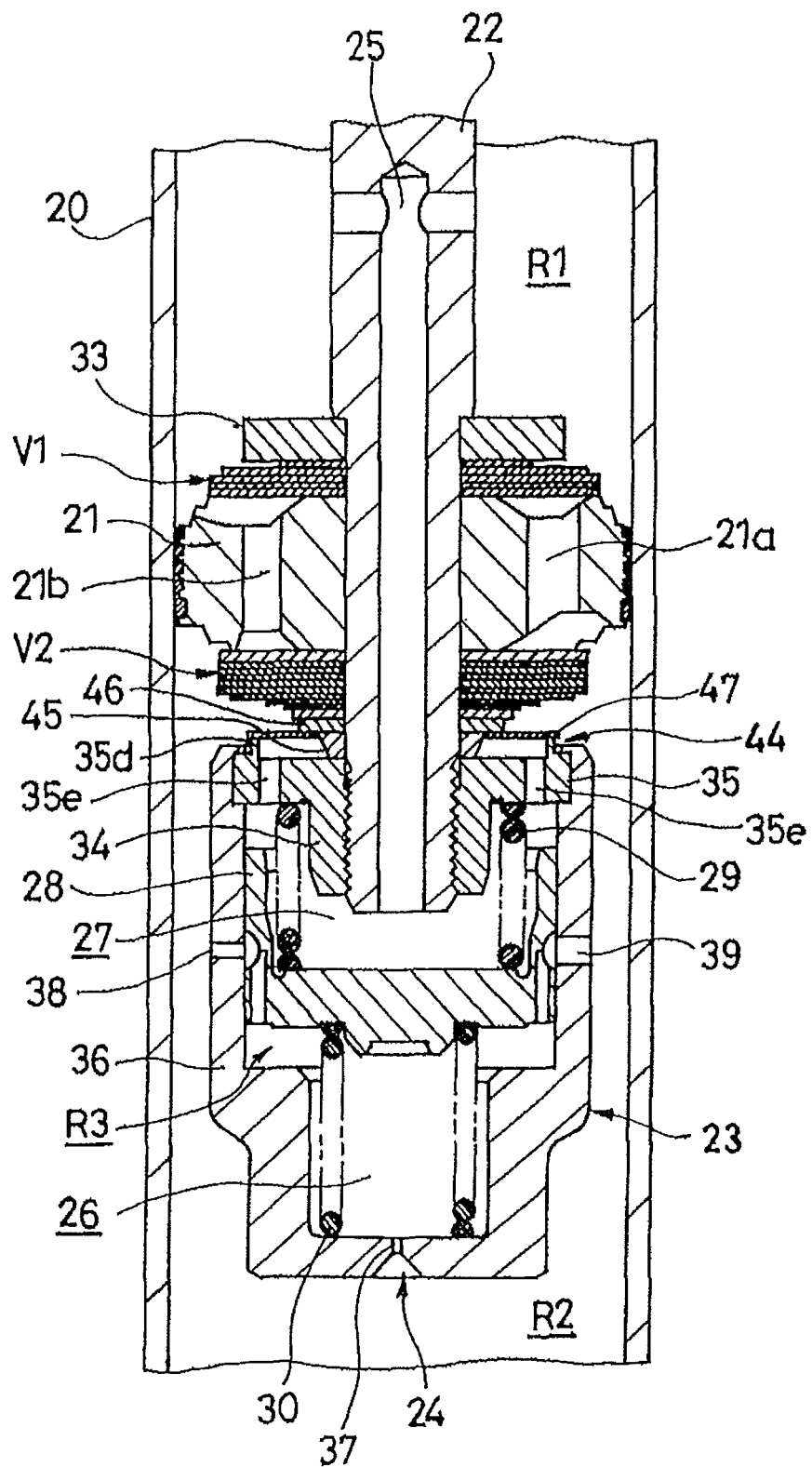
FIG. 11 is a partially enlarged longitudinal sectional view showing a fifth modified example of the specific shock absorbing device.
Figure 12:
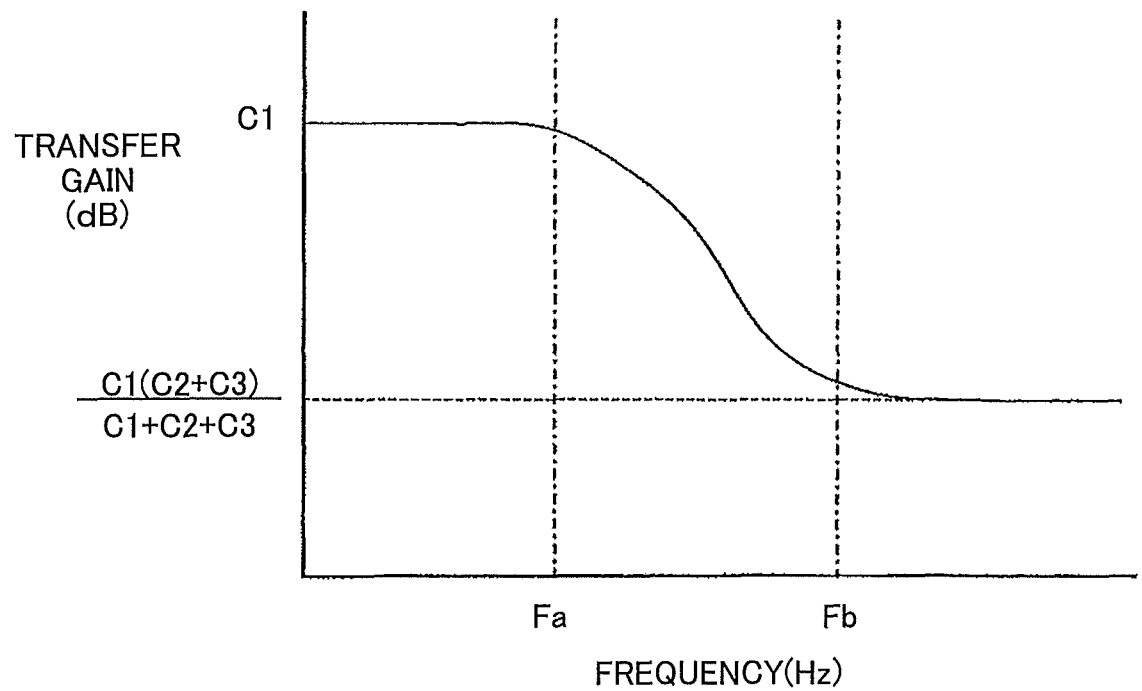
FIG. 12 is a Bode diagram showing the gain characteristic of the frequency transfer function of the pressure relative to the flow rate in a conventional shock absorbing device.
Figure 13:
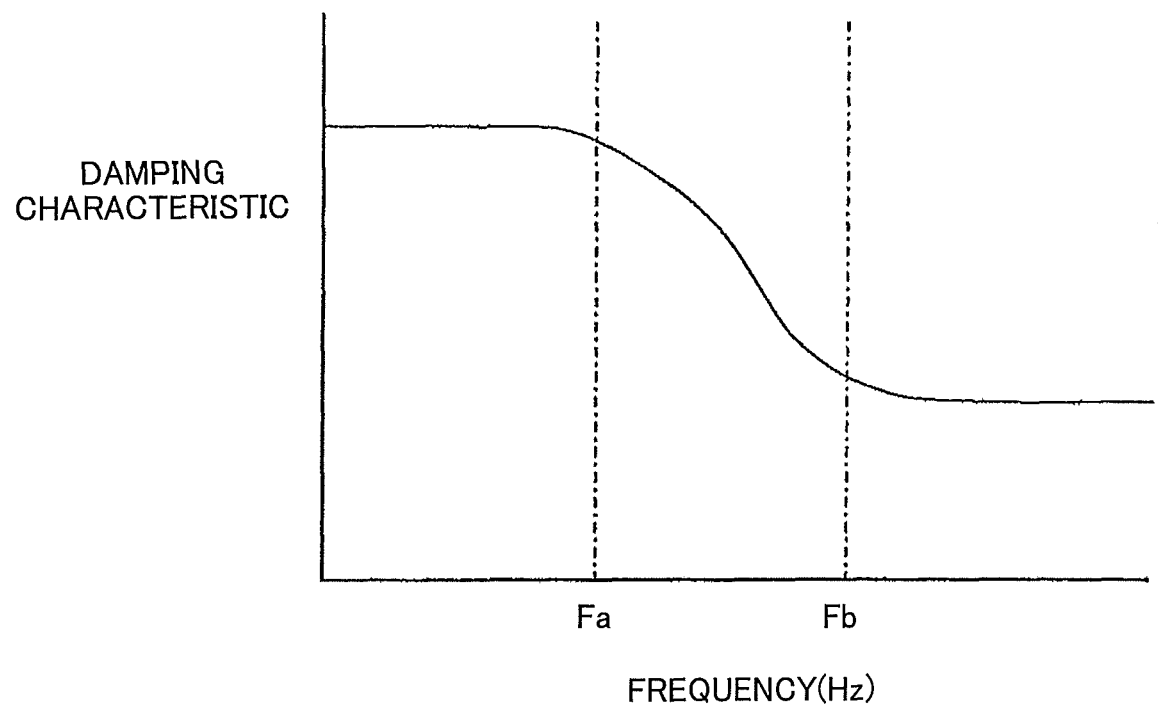
FIG. 13 is a view showing the damping characteristic of the conventional shock absorbing device relative to the vibration frequency.

When the pressure of the other chamber 27 exceeds the pressure of the lower chamber R2 such that the differential pressure therebetween reaches the valve opening pressure, the outer peripheral side of the leaf valve 47 is deformed toward the upper side in FIG. 11 by the pressure of the other chamber 27, and as a result, the leaf valve 47 separates from the valve seat 35d, thereby opening the bypass flow passage 31 such that the pressure of the upper chamber R1 escapes into the lower chamber R2 via the other chamber 27. Thus, the relief valve 44 functions as a pressure chamber side relief valve. Conversely, when the pressure of the lower chamber R2 exceeds the pressure of the other chamber 27 such that the differential pressure therebetween reaches the valve opening pressure, the inner peripheral side of the leaf valve 47 is deformed toward the lower side in FIG. 11 by the pressure of the lower chamber R2, and as a result, the leaf valve 47 separates from the valve seat member 46, thereby opening the bypass flow passage 31 such that the pressure of the lower chamber R2 escapes into the upper chamber R1 via the other chamber 27. Thus, the relief valve 44 functions as an operating chamber side relief valve. In other words, the leaf valve 47 is set to open both inwardly and outwardly.

With the relief valve 44 constituted in this manner, the bypass flow passage 31 is opened by the internal pressure of the other chamber 27 when the piston speed is high during the expansion stroke of the shock absorbing device, and therefore the damping force generated during expansion of the shock absorbing device can be reduced. When the piston speed is high during the contraction stroke of the shock absorbing device, on the other hand, the bypass flow passage 31 is opened by the internal pressure of the lower chamber R2, and therefore the damping force generated during contraction of the shock absorbing device can be reduced. In other words, the relief valve 44 is capable of reducing the damping force on both the expansion side and the contraction side when the piston speed is high.

Further, the relief valve 44 employs the leaf valve 47 that opens both inwardly and outwardly, and therefore the damping force generated by the shock absorbing device on both the expansion side and the contraction side can be reduced by a single leaf valve, i.e. without employing a constitution in which two bypass flow passages are provided and a single-direction relief valve is provided in each. As a result, reductions in cost and the number of components can be achieved.

An embodiment of this invention was described above, but the above embodiment is merely an example of application of the invention, and the technical scope of this invention is not limited to the specific constitutions of the above embodiment.

This application claims priority based on Japanese Patent Application 2009-012657 published by the Japan Patent Office on Jan. 23, 2009, the entire contents of which are incorporated into this specification by reference.

The invention claimed is:

1. A shock absorbing device comprising:
a cylinder;
a partition wall member that is inserted into the cylinder to be free to slide and partitions an interior of the cylinder into two operating chambers;
a passage that connects the two operating chambers;
a pressure chamber;
a one side flow passage;
an other side flow passage;
a free piston that is inserted into the pressure chamber to be free to slide and partitions the pressure chamber into a one chamber that communicates with one operating chamber of the operating chambers via the one side flow passage, and an other chamber that communicates with the other operating chamber of the operating chambers via the other side flow passage;
a spring element that generates a biasing force for suppressing displacement of the free piston relative to the pressure chamber;
a first bypass flow passage that connects the other chamber and the one operating chamber;
a second bypass flow passage that connects the one chamber and the other operating chamber,
wherein an opening area of an end, which opens onto the pressure chamber, of the first bypass flow passage is unobstructed by the free piston when the free piston slides,
wherein an opening area of an end, which opens onto the pressure chamber, of the second bypass flow passage is unobstructed by the free piston when the free piston slides,
further wherein both the first bypass flow passage and the second bypass flow passage are unobstructed by the free piston; and
a relief valve in the first and second bypass flow passages.

2. The shock absorbing device as defined in claim 1, further comprising:
an operating chamber side relief valve that uses a pressure from one of the two operating chambers connected to the first and second bypass flow passages, as a first pilot pressure; and a pressure chamber side relief valve that uses a pressure from one of the one chamber and the other chamber connected to the first and second bypass flow passages, as a second pilot pressure,
wherein the operating chamber side relief valve and the pressure chamber side relief valve are provided in the first and second bypass flow passages in parallel.

3. The shock absorbing device as defined in claim 1, further comprising:
a piston rod inserted into the cylinder such that the partition wall member is fitted onto the piston rod and is fixed to the piston rod; and
a housing, wherein the pressure chamber is provided inside the housing and the housing is disposed in the one operating chamber and screwed to the piston rod.

4. The shock absorbing device as defined in claim 3, wherein
the housing forms the pressure chamber by including an inner tube having a collar, and a closed-end tubular outer tube attached to an outer periphery of the collar,
the free piston contacts an inner periphery of the outer tube slidingly so as to partition the pressure chamber into the one chamber and the other chamber,
the first bypass flow passage penetrates the collar to connect the other chamber and the one operating chamber, and
the relief valve is a pressure chamber side relief valve that comprises an annular leaf valve which is attached to the piston rod so as to be laminated to an operating chamber side of the collar, whereby the first bypass flow passage is opened and closed by the leaf valve.

5. The shock absorbing device as defined in claim 4, wherein the leaf valve is formed by laminating a plurality of annular plates, and the shock absorbing device further comprises:
a ring interposed between arbitrary annular plates of the annular plates to apply an initial deformation to the annular plates.

6. The shock absorbing device as defined in claim 4, further comprising an annular interposed member that forms a part of the first bypass flow passage and is inserted between the collar and the leaf valve.

7. The shock absorbing device as defined in claim 4, further comprising an interposed member that is inserted between the collar and the leaf valve and forms a part of the first bypass flow passage, the interposed member is provided with an annular seat portion on/from which the leaf valve sits/separates and which applies an initial deformation to the leaf valve.

8. The shock absorbing device as defined in claim 4, wherein the leaf valve functions as a pressure chamber side relief valve that opens the first bypass flow passage by deforming an outer periphery of the leaf valve in response to a flow heading toward the one operating chamber from the other chamber, and functions as an operating chamber side relief valve that opens the first bypass flow passage by deforming an inner periphery of the leaf valve in response to a flow heading toward the other chamber from the one operating chamber.

9. The shock absorbing device as defined in claim 4, wherein the spring element comprises a one chamber side spring accommodated in the one chamber and an other chamber side spring accommodated in the other chamber,
the free piston is sandwiched between the one chamber side spring and the other chamber side spring, and
the shock absorbing device further comprises an annular spring support that supports one end of the other chamber side spring and is provided on an outer periphery of the inner tube to prevent blockage of the first bypass flow passage.

10. The shock absorbing device as defined in claim 1, wherein the first bypass flow passage has a first end that opens onto the other chamber, and a second end that selectively opens onto the one operating chamber.

11. The shock absorbing device as defined in claim 1, wherein the first bypass flow passage has
- a first end that opens onto the other chamber, and
- a second end that selectively opens onto the one operating chamber, further wherein the second bypass flow passage has
- an other first end that opens onto the one chamber, and
- an other second end that selectively opens onto the other operating chamber.

12. The shock absorbing device as defined in claim 1, wherein each of the first and second bypass flow passages is always unobstructed by any free piston.

\* \* \* \* \*